United States Patent [19]
Tonucci et al.

[11] Patent Number: 6,087,274
[45] Date of Patent: Jul. 11, 2000

[54] NANOSCALE X-Y-Z TRANSLATION OF NANOCHANNEL GLASS REPLICA-BASED MASKS FOR MAKING COMPLEX STRUCTURES DURING PATTERNING

[75] Inventors: Ronald J. Tonucci, Waldorf; Douglas H. Pearson, Laurel, both of Md.

[73] Assignee: The United States of America as represented by the Secretary of the Navy, Washington, D.C.

[21] Appl. No.: 09/034,310

[22] Filed: Mar. 3, 1998

Related U.S. Application Data

[60] Provisional application No. 60/040,015, Mar. 3, 1997.
[51] Int. Cl.⁷ .................................................... C03C 15/00
[52] U.S. Cl. ..................... 438/758; 438/943; 438/945; 438/947; 216/54
[58] Field of Search ............................ 216/54; 438/758, 438/943, 945, 947

[56] References Cited

U.S. PATENT DOCUMENTS

| 5,234,594 | 8/1993 | Tonucci et al. | 210/500.26 |
| 5,264,722 | 11/1993 | Tonucci et al. | 257/443 |
| 5,306,661 | 4/1994 | Tonucci et al. | 437/90 |
| 5,332,681 | 7/1994 | Tonucci et al. | 437/16 |
| 5,855,716 | 1/1999 | Tonucci et al. | 156/230 |

OTHER PUBLICATIONS

Berry, A.D., R. J. Tonucci, M. Fatemi, "Fabrication of GaAs and InAs Wires In Nanochannel Glass", Applied Physics Letters, v69, 2846–2848, Nov. 4, 1996.

Primary Examiner—Carl Whitehead, Jr
Assistant Examiner—Toniae M. Thomas
Attorney, Agent, or Firm—Barry A. Edelberg; John J. Karasek

[57] ABSTRACT

The present invention is a process for making complex structures with nanoscale resolution in parallel by placing an NCG replica-based mask (or other suitable mask) in close proximity to a substrate and controlling, with nanoscale accuracy and precision, the relative movement of the mask and substrate while sequentially or concurrently carrying out a patterning process or processes. Another aspect of the invention is a diamond film with submicron and/or nanoscale features, that can be made by the method of the invention.

36 Claims, 4 Drawing Sheets

NANOSCALE X-Y-Z TRANSLATION OF NANOCHANNEL GLASS REPLICA-BASED MASKS FOR MAKING COMPLEX STRUCTURES DURING PATTERNING

This application claims benefit of Provisional Application 60/040,015 filed Mar. 3, 1997.

BACKGROUND OF THE INVENTION

1. Field of the Invention

The present invention relates to methods for making complex structures in parallel with nanoscale resolution by X-Y-Z translation (with nanoscale precision and accuracy) of shadow masks during simultaneous patterning processes. The resulting structures are therefore more complex than the patterns present in translated shadow masks themselves.

2. Description of the Related Art

It is a continuing goal in miniaturization efforts (e.g. electronics) to make structures with nanoscale resolution. It is particularly desired to make numerous complex structures simultaneously using parallel processing techniques. Currently, serial techniques such as electron-beam (e-beam) lithography, atomic force microscope (AFM) patterning, and scanning tunneling microscope (STM) patterning, are used to make nanoscale structures on substrates. These techniques require a large number of processing steps as well as pixel-by-pixel exposure. More recently, nanochannel glass (NCG) replica membranes have been used as shadow masks in non-lithographic patterning for making large numbers of nanoscale structures in parallel (Pearson et al., *Science*, infra). These NCG replica membranes, which are membranes of various materials that contain large numbers of nanoscale patterned voids, are made by replicating NCG materials as described in a recent patent application (Navy Case No. 76,715, infra). A desirable method of patterning would involve the flexibility to combine useful aspects of both serial and parallel patterning, namely, the ability to make highly complex structures (serial patterning) and the ability to make large numbers of structures simultaneously (parallel patterning). Applications of such patterning would include the fabrication of electronic devices, quantum electronic devices, magnetic memory, and optoelectronic devices to name a few.

SUMMARY OF THE INVENTION

Accordingly, it is an object of this invention to provide a method to make structures (simple or complex) with nanoscale resolution.

It is a further object of this invention to make these structures in parallel.

It is a further object of this invention that this method be inexpensive.

It is a further object of this invention to make these structures in larger numbers over larger overall areas than can currently be made by other methods, such as E-beam lithography.

These and additional objects of the invention are accomplished by the structures and processes hereinafter described.

The present invention is a process for making complex structures with nanoscale resolution in parallel by placing an NCG replica-based mask (or other suitable mask) in close proximity to a substrate and controlling, with nanoscale accuracy and precision, the relative movement of the mask and substrate while sequentially or concurrently carrying out a patterning process or processes.

Another aspect of the invention is a diamond film with submicron and/or nanoscale features, that can be made by the method of the invention.

As used herein, an NCG-based replica mask is an NCG replica mask (as described in Navy Case No. 76,715, supra), or a replica of such a replica (a second generation replica), or a later generation replica, or any mask derived from an NCG replica.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Figure 1A:
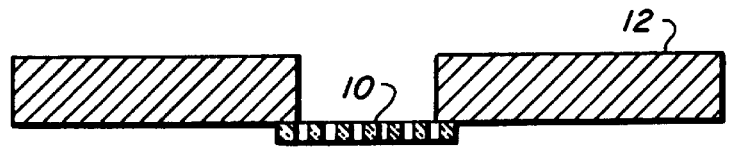
FIGS. 1A, 1B, and 1C show the sequence of steps to the invention in block diagram form in cross-sectional (side) view where the mask on its support structure is mounted in fixed position to the platform housing and the substrate to be patterned is mounted to a high precision X-Y-Z translation stage.

Nanochannel glasses with preselected patterns will be made following techniques previously taught by the inventors. The following are incorporated by reference herein, in their entireties, for all purposes:

(a) U.S. Pat. No. 5,332,681, issued Jul. 26, 1994 to Tonucci et al. [Tonucci '681];

(b) U.S. Pat. No. 5,264,722, issued Nov. 23, 1993 to Tonucci et al. [Tonucci '722];

(c) U.S. Pat. No. 5,306,661, issued Apr. 26, 1994 to Tonucci et al. [Tonucci '661];

(d) Tonucci et al., "Nanochannel Array Glass", *Science* 258 783–85 (Oct. 30, 1992);

(e) Pearson et al., "Nanochannel Glass Replica Membranes", *Science* 270 68–70 (Oct. 6, 1995);

(f) U.S. patent application Ser. No. 08/725,211, filed on Sep. 24, 1996 for "PARALLEL CONTACT PATTERNING USING NANOCHANNEL GLASS", and designated as Navy Case No. 76,713;

(g) U.S. patent application Ser. No. 08/725,213, filed on Sep. 24, 1996 for "NANOCHANNEL GLASS REPLICA MEMBRANES", and designated as Navy Case No. 76,715; and (h) Eddy et al., "Deep submicron pattern transfer using high density plasma etching and nanochannel glass replica technology", *Applied Physics Letters* 68 (10) 1397–99 (Mar. 4, 1996).

As used herein, the term "relative", when referring to the translation or rotation of a mask with respect to a substrate means that the translational or rotational positions of the substrate and the mask are changed. Thus, the phrase "translating the mask relative to the substrate" contemplates that the position of the mask relative to the substrate changes. This may be effected by (1) moving the mask, (2) moving the substrate, or (3) moving both the mask and the substrate. It is to be understood that unless specified otherwise, translation and/or rotation of a mask according to the present invention means relative translation and/or rotation.

An important feature of the present invention is the accuracy and precision with which the mask may be rotated and/or translated with respect to the substrate. A critical feature of the present invention is the ability to translate and/or rotate a mask with nanoscale precision and accuracy. Such translations and rotations are referred to herein as "nanoresolution translation" and "nanoresolution rotation". Patterning steps associated with such nanoresolution translation and/or nanoresolution rotation will sometimes be referred to herein as "writing" steps, because each void/feature of the mask may typically be associated with writing a single device, in the sense that these translations, when coupled with the appropriate patterning steps, will be able to effect the writing of such devices. A corollary to this is that these nanoresolution translations typically take place over a range of travel approximately equal to the size of a device. Currently, there are several commercially available X-Y-Z translation stages that perform translations over a range of travel up to about 500 $\mu$m with accuracy and precision of 5 nm or less. Such devices would be suitable for nanoresolution translation according to the present invention. Among these devices is the following: Physik Instruments P-731.20. It is anticipated, however, that improvements in the translation stage art will permit nanoresolution translations will accuracy and precision well below 1 nm and ranges of travel well in excess of 500 $\mu$m. Nanoresolution rotations are defined herein as rotational resolution to $10^{-6}$ radians or better.

Typically, another type of translation also will be employed in practicing the present invention. After all of the writing for a particular device (or group of devices) has been achieved (i.e., all the nanoresolution translations and/or rotations, and all the patterning steps), it will typically be desired to move the mask to a fresh, unpatterned area of the substrate, to permit the writing of a new pattern. It will be desired to effect such translations with at least micron scale precision and accuracy. Such translations are referred to herein as "microresolution translations". These translations will sometimes be referred to herein as "wide-area translations", or as "shifts", because the mask is being shifted to an entirely new area of the substrate. Currently, there are several commercially available X-Y-Z translation stages that perform translations over a range of travel up to about 200 mm (or even higher) with accuracy and precision of 1 $\mu$m or less. Such devices would be suitable for microresolution translation according to the present invention. Among these devices is the following: Physik Instruments M-422.20/M-415.10.

Rotations may be either about an axis perpendicular to the substrate ($\theta$ rotations), about an axis parallel to the substrate ($\phi$ rotations), or about some other axis.

Figure 1B:
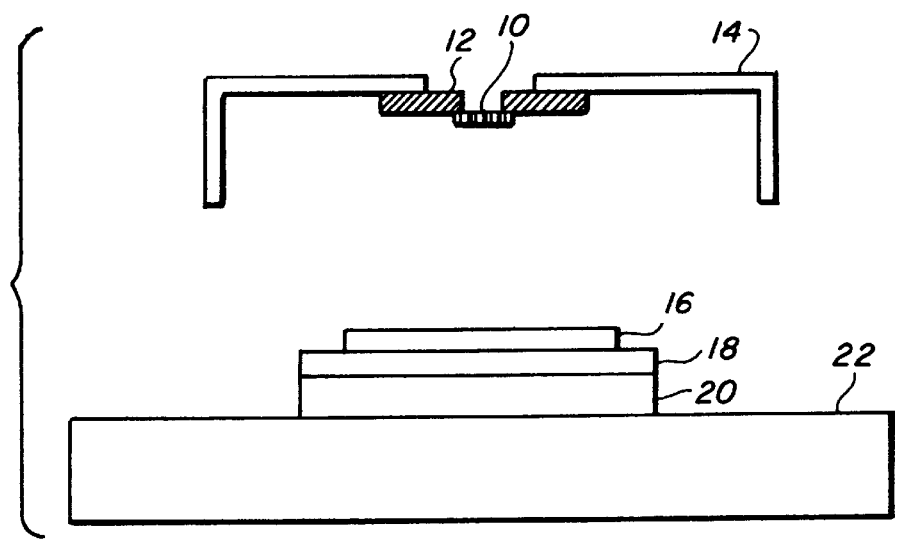
Figure 1C:
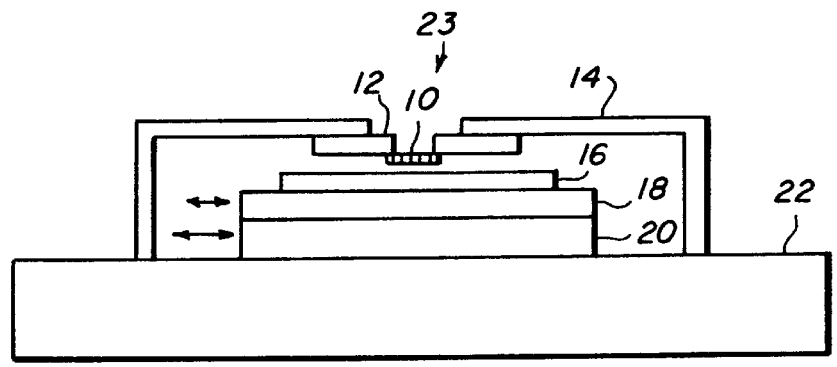

Referring to FIGS. 1A–1C, the invention is preferably practiced as follows. As shown in FIG. 1A, an NCG replica mask 10 of desired thickness is prepared with a desired pattern of voids from a desired material. This mask is then placed over an aperture in a support structure 12 (e.g. a silicon wafer) and is bonded to the support structure by conventional micro-soldering techniques or other methods.

As shown in FIG. 1B, this mask support structure is then attached to the platform structure 14. A substrate 16 to be patterned is then bonded to the nanoscale precision X-Y-Z translator 18 mounted on a wide area, high precision translation table 20. Finally, as shown in FIG. 1C, the platform structure 14 is attached to the translator base 22, and the mask 10 is brought into close proximity to the substrate 16. In this manner the mask 10 is fixed in position relative to the platform structure 14 and translator base 22, and the substrate 16 is able to move in X, Y, and Z directions relative to the fixed mask 10.

The mask support and substrate are then "zeroed" and leveled with respect to each other through the use of microresolution and nanoresolution z adjustments which also allow for tilting the mask support and substrate. This can be accomplished by allowing electrical contact to the mask from behind and contacting electrical pads placed previously on the substrate. Other approaches include previously fabricating a mask support with a built-in AFM tip or by using photon tunneling.

The nanoscale translation device and wide area, high precision translation table are commercially available devices. Nanoscale translation devices are typically based upon piezoelectric transducer (e.g., PZT) materials which are currently capable of providing travels of 100 microns in X, Y, and Z directions with 1 nm resolution. Wide area, high precision translation tables are capable of providing travels of 200 mm (7.8 inches) with 1 micron resolution. Thus, an arrangement consisting of a PZT nanoscale translation device mounted on a wide area, high precision translation table is capable of patterning multiple local areas on a conventional substrate, where the pattern prepared in each local area may have minimum feature sizes on the order of 10 nm and where the pattern resolution in each local area is controlled to 5 nm or better. The position of the local patterned areas on the substrate may be controlled to a resolution of 1 micron or better over substrate diameters of 6 inches or more.

Once the substrate is initially positioned with respect to the mask as desired, a patterning process 23, indicated in FIG. 1C by the vertical arrow, is carried out over a local area while sequentially or concurrently translating (with nanoscale resolution) the substrate relative to the mask in a controlled fashion. The patterning process might be materials deposition by thermal evaporation, in which case the evaporated material passes through the voids present in the mask and is deposited onto the substrate as a collection of patterned structures defined by the X-Y-Z translation. The number of patterned structures formed on the substrate is equal to the number of individual voids through which the material is deposited. Other materials deposition processes which may be used as the patterning process include sputtering, electron beam evaporation, molecular beam epitaxy (MBE), cluster deposition, adsorption, and photon assisted deposition. Patterning processes other than materials deposition may also be carried out including ion milling, reactive ion etching (RIE), other dry chemical etching, intense photon laser drilling, photon assisted etching, ion implantation, development of resists (by X-rays, photons, ions, and electrons), and various combinations of these processes.

An alternative but essentially equivalent method of practicing the invention involves placing the substrate in a fixed position relative to the translator housing and attaching the mask support structure to a movable X-Y-Z translation stage which supports the mask support structure from the edges.

Figure 2A:
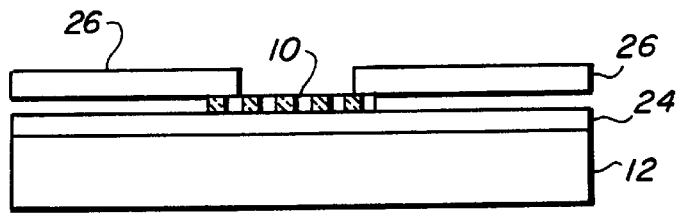
FIGS. 2A, 2B, and 2C show the sequence of steps to the invention in block diagram form in cross-sectional (side) view for a method for making a particularly desirable mask and support design, with the mask inherently built into the mask support.
Figure 2B:
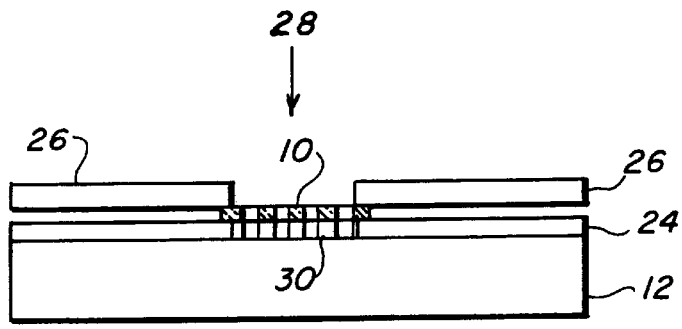
Figure 2C:
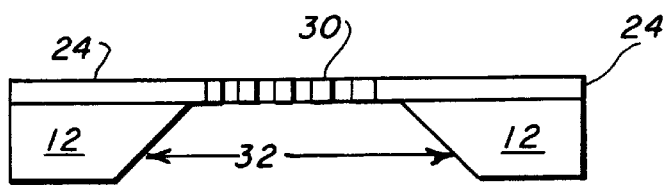

Alternative mask and support designs may also utilized in the practice of the invention. A particularly desirable mask and support design is one in which the mask is inherently built into the mask support. Referring to FIGS. 2A–2C, such a design may be made as follows. As shown in FIG. 2A, a desired layer of material 24, such as silicon nitride, is deposited by a suitable technique onto the mask support 12 (e.g. a polished silicon wafer) which contains no aperture(s). An NCG replica mask 10 of desired thickness with a desired pattern of voids made from a desired material is then placed on the layer 24. A protective overlay containing an aperture 26 is then placed over the NCG replica mask 10 (and the layer 24) such that the edges of the NCG replica mask 10 are shadowed. Next, referring to FIG. 2B,, an etch process, such as reactive ion etching or ion milling, is directed through the aperture such that pattern of voids present in the NCG replica mask is transferred into the layer 24 creating a patterned region of voids 30 locally through the entire thickness of the layer 24 in the region indicated. The type of materials chosen for the protective overlay 26 and the NCG replica mask 10 should be relatively layer 24, in contrast, process 28, and the material chosen for the layer 24, in contrast, should be relatively easily etched. As shown in FIG. 2C, after etching the protective overlay 26 and the NCG replica mask 10 are removed. Finally, a window aperture 32 is opened in the mask support 12 from the opposing side, exposing the patterned region 30. The window aperture 32 is opened using conventional masking and wet chemical etching techniques. The resulting structure is a mask (the patterned region 30) inherently bonded to a support structure 12 which may be used in the practice of the invention.

Another alternative method of practicing the invention involves the use of a plurality of masks. In such a method, a plurality of masks, e.g., identical masks, could be mounted on a common mask support, and translated relative to the substrate in an identical manner. Accordingly, a single writing sequence may be performed over an area much larger than the area of a single mask, either on a single wafer or on a plurality of wafers. This method may be referred to as "second-order parallel processing", in that each mask with a plurality of apertures is capable of parallel processing, and this capability may be multiplied by the number of masks mounted as an array on a common mask support. For example, if a mask having $4 \times 10^7$ voids was used in a patterning process as described above, then $4 \times 10^7$ patterns could be written concurrently. However, if 1000 of such masks were mounted on a common mask support, then $4 \times 10^{10}$ patterns could be written concurrently. Skilled practitioners might find it preferable to make and to work with 1000 masks with $4 \times 10^7$ voids than a single mask with $4 \times 10^{10}$ voids.

Other alternative methods of practicing the invention are also available. The mask may be mounted on both the nanoresolution stage(s) and the microresolution stage (e.g., the mask is mounted on the nanoresolution stage, which is in turn mounted on the microresolution stage, or vice-versa). The substrate may be mounted on both the nanoresolution stage(s) and the microresolution stage (e.g., the substrate is mounted on the nanoresolution stage, which is in turn mounted on the microresolution stage, or vice-versa). Or the substrate may be mounted on one stage, and the mask may be mounted on the other.

Sources having a flux that is at least partially divergent, and mask translations along the Z axis will be used by skilled practitioners to vary the width and flux of a patterning step. A corollary to this is the flux at the substrate may be reduced or enhanced, depending upon the Z separation between the mask and substrate. Accordingly, one may consider a material passing through an aperture in a mask depositing material over a given substrate area. If the mask is moved further from the substrate, the coverage area of the material on the substrate will spread. Conversely, if the mask is moved closer to the substrate, the coverage area of the material on the substrate will shrink, limited by the diameter of the aperture. Thus, the same aperture in a mask may write features of different sizes.

Figure 3A:
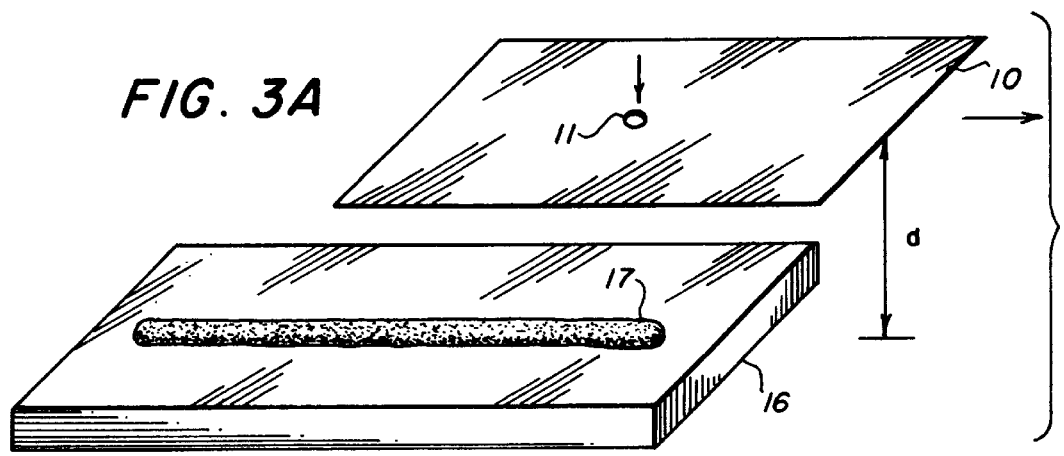
FIGS. 3A, 3B, and 3C show the steps in a method for making a crossover according to the invention.

Accordingly, complex devices having features of various sizes may be made using a single mask, according to the method of the invention. For instance, referring to FIGS. 3A–3C, an electrical crossover may be made according to the method of the invention. Referring to FIG. 3A, an NCG replica mask 10 is positioned over a substrate to be patterned 16, where the substrate 16 and/or the mask 10 are configured for relative translation. The substrate is some distance d from the mask. As the mask is translated relative to the substrate (as indicated by the horizontal arrow), a conductive material is deposited (using a source with a partially divergent flux) through an aperture 11 in the mask 10 (as shown by the vertical arrow), depositing a line of conductive material 17 onto the substrate.

Figure 3B:
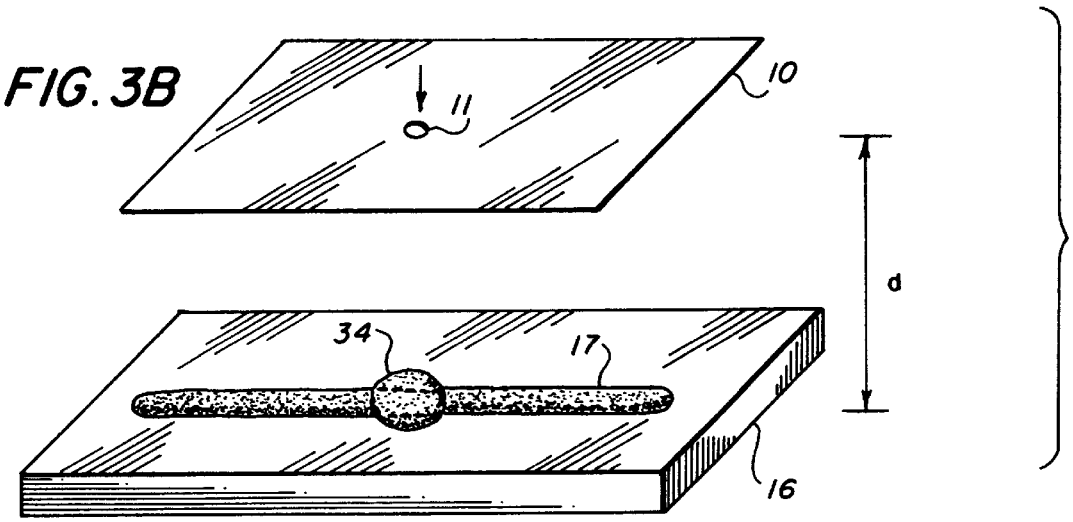

The mask 10 is then moved away from the substrate 16 (d is increased, thereby increasing the spot size), as shown in FIG. 3B, and a dielectric material is deposited through the aperture 11 onto the substrate at a preselected crossover point, forming an insulating cap 34 over the conductive line 17.

Figure 3C:
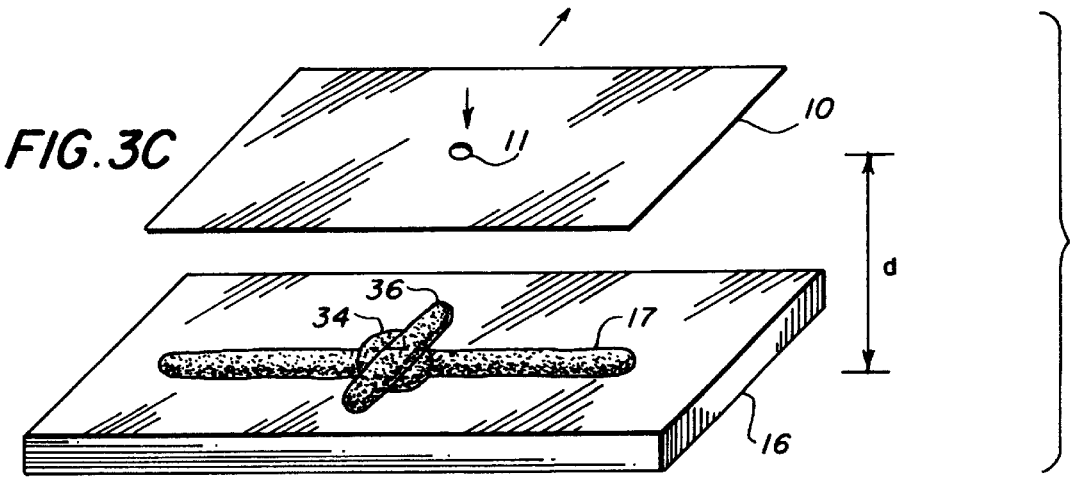

As seen in FIG. 3C, the mask is moved back towards the substrate (d is decreased), and a second conductive line 36 is deposited over the first conductive line 17, crossing at the insulating cap 34, which insulates the two conductive lines 17,36 from each other.

Variations on this method are within the scope of the invention. For example, if the insulating cap were extended the length of the first conductive line, a second conductive line could be deposited over and parallel to the first conductive line, thereby making a stacked bus.

As used herein, when describing a discrete process step, "patterning" a substrate may refer to depositing a material on a substrate, modifying a substrate (e.g., by causing a chemical reaction on the substrate such as a photoreaction, or ion implantation), or etching away from the substrate (removing material from the substrate by application of an etchant).

Due to the exceptional resolutions, minimum feature sizes, packing densities, patterned area sizes, and numbers of devices, exceptional devices may be made according to the present invention. For example, the method of the invention can be practiced where the writing process is controlled to a resolution of 5 nm over a local area encompassing 100 microns in X, Y, and Z directions, or to a resolution of 10 nm over a local area encompassing 200 microns in X, Y, and Z directions, or to a resolution of 50 nm over a local area encompassing 1000 microns in X, Y, and Z directions. The method of the invention can be practiced where multiple local areas are patterned resulting in overall patterned areas 1 inch in diameter, 3 inches in diameter, 6 inches in diameter, or 12 inches in diameter. The method of the invention can be practiced where the minimum feature size of the patterned area is 10 nm, 50 nm, or 100 nm. The method of the invention can be practiced where the number of patterned structures made is greater than $10^5$, greater than $10^7$, greater than $10^9$, or greater than $10^{11}$.

Having described the invention, the following examples are given to illustrate specific applications of the invention, including the best mode now known to perform the invention. These specific examples are not intended to limit the scope of the invention described in this application.

PROPHETIC EXAMPLE 1

Figure 4:
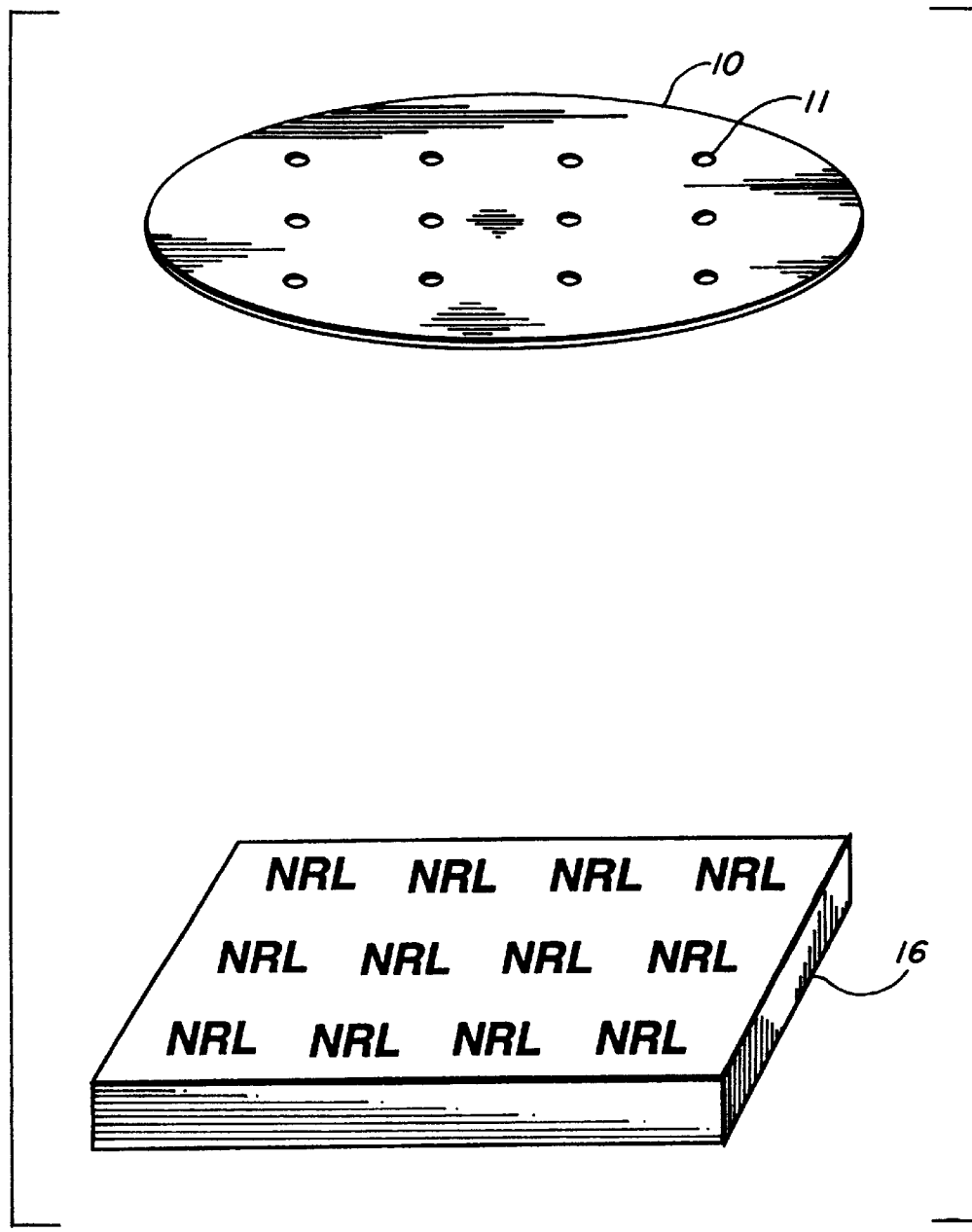
FIG. 4 shows an elevation view of a mask for use in the present invention, and a typical patterned substrate made by the method of the invention, where the plurality of individual patterns are made in parallel in a single writing sequence.

A circular-shaped NCG replica mask 7 mm in diameter 150 nm thick containing $3.8 \times 10^7$ circular voids 40 nm in diameter arranged in a square array with separations of one micron is made from platinum metal by methods previously taught. This membrane is then placed over a 5 mm circular aperture in a polished silicon wafer support structure 0.5 mm thick and 2 cm in diameter which has been previously metal coated on both sides by thin film deposition to ensure electrical conduction between both sides of the polished wafer support structure. The NCG replica mask is then micro soldered in place ensuring that the solder joints do not extend above the surface of the NCG replica mask. The number of voids which remain exposed through the 5 mm aperture is approximately $2 \times 10^7$. The support structure containing the mask is then attached to the fixed platform of the X-Y-Z translation device. A polished silicon wafer 6 inches in diameter with four metal contact electrodes 0.1 mm wide by 1.0 mm long by 20 nm high located near the area to be patterned is then bonded to the nanoscale resolution X-Y-Z translator. The fixed platform containing the mask support structure and mask is then attached to the translator housing base bringing the mask and substrate into close proximity. External electrical contact is then made to the four electrodes on silicon the wafer as well as to the mask support structure. In order to "zero" the separation between the mask and the substrate, the silicon substrate is positioned and large deviation (micron resolution) leveling adjustments and nanoscale leveling adjustments are made such that each electrical contact pad is made to come into contact with the mask in sequence. The process is repeated until the mask support structure and the substrate are sufficiently parallel. Nanoscale adjustments in separation are then made to bring the mask within 100 nm of the substrate surface. The assembly is then placed under vacuum and control adjustments are made to position the mask in the desired location relative to the substrate. Electron beam evaporation of aluminum is then carried out at a deposition rate of 30 nm per minute with simultaneous nanoscale translation and shutter operation such that each void of the mask results in patterning the letters "NRL" as shown in FIG. 4. Thus $2 \times 10^7$ structures of "NRL" are written with lines approximately 50 nm wide and 10 nm in height (z direction). A large translation of micron resolution parallel to the substrate is then made to shift the mask to an adjacent region of the substrate and the simultaneous aluminum deposition and nanoscale translation are repeated. A particular Z displacement is selected to achieve a preselected linewidth.

PROPHETIC EXAMPLE 2

A mask derived from an NCG replica mask may also be made according to the present invention, i.e., a replica of a replica.

A circular-shaped NCG replica mask 7 mm in diameter 150 nm thick containing $3.8 \times 10^7$ circular voids 50 nm in diameter arranged in a square array with separations of one micron is made from platinum metal by methods previously taught. This membrane is then placed on a silicon wafer support structure 0.5 mm thick over a circular aperture in the wafer 5 mm in diameter. The NCG replica mask is then micro soldered in place ensuring that the solder joints do not extend above the surface of the NCG replica mask. The number of voids which are exposed through the 5 mm aperture is approximately $2 \times 10^7$. The support structure containing the mask is then attached to the fixed platform. A polished diamond wafer to be patterned is then bonded to the nanoscale resolution X-Y-Z translator. The fixed platform is then attached to the translator housing base bringing the mask into close proximity to the substrate.

Ion implantation of carbon is carried out (optionally with simultaneous translation) which results in the formation of amorphous carbon damaged regions in the diamond, corresponding to the position of the voids in the mask (optionally regions on the diamond film exposed by the mask as the mask is translated relative to the substrate). Skilled practitioners recognize that the damage created by ion implantation is related to the final position of the implanted ion. Thus, by controlling the energy and thus the penetration depth of the implanted carbon ions, it will be possible to create, e.g., amorphous carbon damaged regions in the diamond film that begin at the surface and extend downward to a predetermined depth, e.g., through ½ of the thickness of the diamond film (e.g., penetrating up to 1 μm of the diamond substrate).

A second ion implantation is optionally carried out, this time with the mask removed. This implantation is carried out so that an amorphous carbon damaged layer is formed at the base of the amorphous carbon damaged regions in the diamond film made by the first ion implantation step. This layer may serve as a lift-off or buffer layer. Amorphous carbon is etchable. By etching away the amorphous carbon, a freestanding diamond film will remain that replicates the pattern of the mask, which in turn may be a replica of an NCG. In this way, a mask derived from an NCG replica mask may be made, i.e., a replica of a replica. The damage steps may be done in any order, but it will be preferred generally to carry out the deeper damage steps first.

Obviously, many modifications and variations of the present invention are possible in light of the above teachings. It is therefore to be understood that, within the scope of the appended claims, the invention may be practiced otherwise than as specifically described.

What is claimed is:

1. A method for writing a pattern onto a substrate, comprising the steps:

preparing a nanochannel glass (NCG) replica mask or an NCG replica-based mask having one or more apertures therethrough;

mounting said mask adjacent to said substrate on a translation stage for translating said mask relative to said substrate;

translating said mask relative to said substrate, wherein said translation includes translation in at least a direction perpendicular to the plane of said substrate; and patterning said substrate through said mask.

2. The method of claim 1, wherein said patterning step comprises depositing a material selected from the group consisting of metals, ceramics, and organics, through said one or more apertures in said mask, and onto said substrate.

3. The method of claim 1, wherein said patterning step comprises depositing a material selected from the group consisting of conductors, semiconductors, superconductors, and insulators, through said one or more apertures in said mask, and onto said substrate.

4. The method of claim 1, wherein said patterning step comprises exposing said substrate to ions, electrons, or photons through said one or more apertures in said mask.

5. The method of claim 1, wherein said translating step further comprises translating said mask parallel to the plane of said substrate.

6. The method of claim 1, wherein said translating and said patterning are performed concurrently.

7. The method of claim 1, wherein said translating and said patterning are performed sequentially.

8. The method of claim 7, wherein said sequential translating and patterning comprises at least two patterning steps separated by a translating step, and wherein said at least two patterning steps form a nanoresolution pattern.

9. The method of claim 1, wherein said patterning produces features having resolution of 5 nm over a substrate positions at least 100 µm apart.

10. The method of claim 1, wherein said patterning produces at least $10^9$ features.

11. The method of claim 1, further comprising the steps of:
preparing at least one additional NCG replica or NCG replica-based mask having one or more apertures therethrough; and
mounting said at least one additional mask adjacent to said substrate on said translation stage for translating said mask relative to said substrate;
wherein said translating step further comprises translating said at least one additional mask relative to said substrate in at least a direction perpendicular to said substrate, and wherein said patterning step further comprises patterning said substrate through said at least one additional mask.

12. A method for writing a pattern onto a substrate, comprising the steps:
preparing a nanochannel glass (NCG) replica mask or an NCG replica-based mask having one or more apertures therethrough;
mounting said mask adjacent to said substrate on a rotation stage for rotating said mask relative to said substrate;
rotating said mask relative to said substrate; and
patterning said substrate through said mask.

13. The method of claim 12, wherein said rotation comprises rotation through an angle θ about an axis perpendicular to the plane of said substrate.

14. The method of claim 12, wherein said rotation comprises rotation through an angle φ about an axis parallel to the plane of said substrate.

15. The method of claim 12, wherein said rotating and said patterning are performed concurrently.

16. The method of claim 12, wherein said rotating and said patterning are performed sequentially.

17. The method of claim 16, wherein said sequential rotating and patterning comprises at least two patterning steps separated by a rotating step, and wherein said at least two patterning steps form a pattern.

18. The method of claim 16, wherein said method further comprises translating said mask relative to said substrate.

19. The method of claim 18, wherein said translating and rotating are performed concurrently.

20. The method of claim 18, wherein said translating and rotating are performed sequentially.

21. The method of claim 12, wherein said mask comprises a metal selected from the group consisting of platinum, gold, aluminum, palladium, tungsten, molybdenum, and copper.

22. The method of claim 12, wherein said mask is selected from the group consisting of amorphous alloys, amorphous oxides, crystalline alloys, and crystalline oxides.

23. The method of claim 12, wherein said mask is selected from the group consisting of silicon nitride and silicon carbide.

24. The method of claim 12, wherein said mask comprises a polymer.

25. The method of claim 12, wherein said mask comprises a carborane.

26. The method of claim 12, wherein said mask has a plurality of apertures therethrough.

27. The method of claim 12, wherein said mask has a local packing density of at least $10^9$ features/cm$^2$.

28. The method of claim 12, wherein said mask has a minimum feature size of below 100 nm.

29. The method of claim 12, wherein said mask has a minimum feature size of below 10 nm.

30. The method of claim 12, wherein said mask has global registration of features.

31. The method of claim 12, wherein said substrate is a substrate selected from the group consisting of semiconductors, glasses, dielectrics, conductors, and superconductors.

32. A method for making an electronic crossover, comprising the steps:
preparing an NCG replica mask or an NCG replica-based mask having one or more apertures therethrough;
mounting said mask adjacent to said substrate on a translation stage for translating said mask relative to said substrate;
translating said mask relative to said substrate in a first direction parallel to said substrate, so that an aperture in said mask passes over a crossover point on said substrate, while depositing a conductive material onto said substrate through said mask, thereby forming a first conductive line on said substrate through said crossover point;
translating said mask relatively away from said substrate;
positioning said aperture over said crossover point;
depositing a dielectric material through said aperture onto said substrate at said crossover point, thereby forming an insulator cap over said first conductive line;
translating said mask relatively toward said substrate; and
translating said mask relative to said substrate in a second direction parallel to said substrate, so that an aperture in said mask passes over said crossover point on said substrate, while depositing a conductive material onto said substrate through said mask, thereby forming a second conductive line on said substrate through said crossover point;
wherein said insulator cap is adapted for insulating said first and second conductive lines from each other.

33. The method of claim 32, wherein said first and second conductive lines have first and second linewidths respectively, and wherein said insulator cap has a diameter greater than either of said linewidths.

34. The method of claim 32, wherein said aperture for forming said second conductive line is also said aperture for forming said first transmission line.

35. The method of claim 32, wherein said first and second conductive lines cross at an arbitrarily selected angle greater than zero degrees but less than or equal to ninety degrees.

36. A method for making a set of stacked parallel conductive lines, comprising the steps:
preparing an NCG replica mask or an NCG replica-based mask having one or more apertures therethrough;
mounting said mask adjacent to said substrate on a translation stage for translating said mask relative to said substrate;
translating said mask relative to said substrate in a direction parallel to said substrate, while depositing a conductive material onto said substrate through said mask, thereby forming a first conductive line on said substrate;

translating said mask relatively away from said substrate;

translating said mask relative to said substrate in said direction parallel to said substrate while depositing a dielectric material through said aperture onto said first conductive line, thereby forming an insulator cap over said first conductive line;

translating said mask relatively toward said substrate; and translating said mask relative to said substrate in said direction parallel to said substrate, while depositing a conductive material onto said insulator cap through said mask, thereby forming a second conductive line on said substrate parallel to and stacked on said first conductive line;

wherein said insulator cap is adapted for insulating said first and second conductive lines from each other.

* * * * *